May 18, 1926.
C. A. VOLKER
AUTOMOBILE WINDOW SCREEN
Filed May 15, 1925
1,584,910
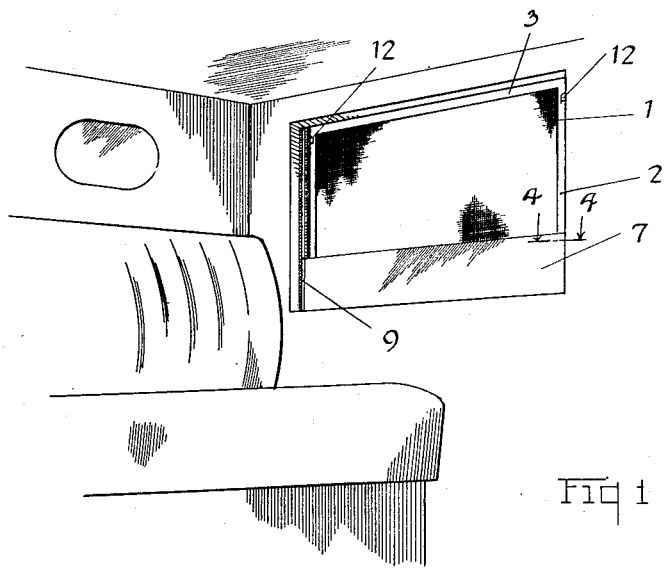
Fig 1
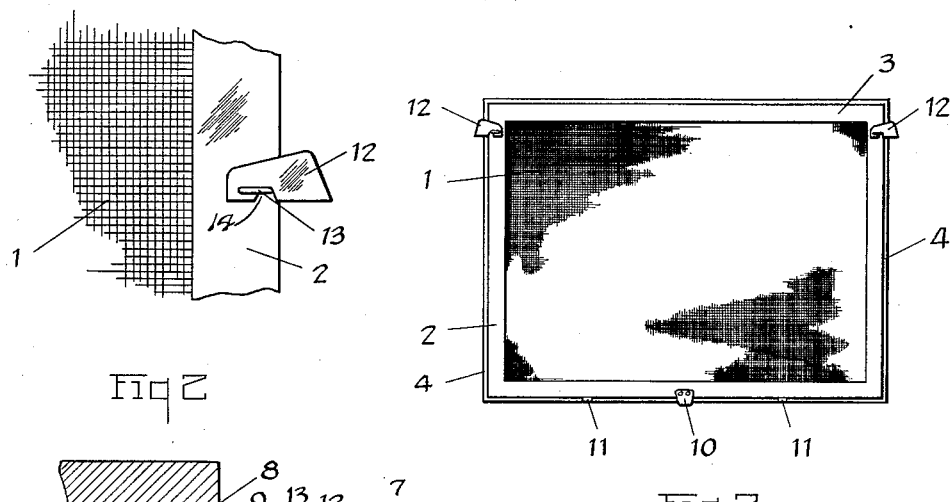
Fig 2
Fig 3
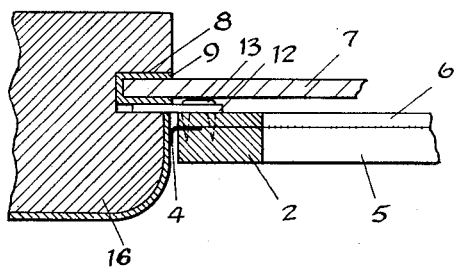
Fig 4
Inventor
Clarence A. Volker
By Owen, Owen & Crampton
Attorney Patented May 18, 1926.

1,584,910

UNITED STATES PATENT OFFICE.

CLARENCE A. VOLKER, OF MONROE, MICHIGAN.

AUTOMOBILE WINDOW SCREEN.

Application filed May 15, 1925. Serial No. 30,483.

My invention has for its object to provide a window screen that is particularly applicable for screening automobile windows.

The walls of closed automobile bodies are as thin as can possibly be made and yet conserve the strength produced in the frame by the main stress and strain sustaining members. This is done, as is well known, to obtain the maximum space within the body of the automobile compared to its exterior dimensions. The windows are located between parts of the frame of the body and of the doors which form a part of the frame of the body, when considered as a whole, the parts being so connected as to form window openings. The glass plates which constitute the movable or window closing element of the windows are located between parts of the frame and cushioned runners or guides, for guiding the windows, when raised and lowered, are located in channels that are formed in or secured to the parts of the frame. This provides means whereby the windows may be readily shifted in the window wells and in the window openings of the frame and at the same time prevent rattling of the windows. This construction, however, leaves a very narrow outer edge portion in the frame openings for screening purposes and a very small space for securing the screens in position. Also the opening, or the space between the window frame parts, vary slightly in shape in the manufacture of the automobile and also will vary as the automobile is used. By my invention I have provided a screen that will fit window openings of automobile body frames that differ slightly in shape and may be rigidly secured in position on the outside of the glass and without interference of movement of the glass and will not mar the finish of the automobile around the edge of the window. Thus the invention provides an automobile window screen that will be retained in position notwithstanding the vibration caused by driving the automobile and will not interfere with the raising and lowering of the window.

The invention may be contained in screens that vary in form and, to illustrate a practical application of the invention, I have selected a screen containing the invention and shall describe it hereinafter. The screen selected as an example is shown in the accompanying drawings.

Figure 1 of the drawings is a perspective view of the screen in position showing its relation to the glass that is raised and lowered to open and close the window. Fig. 2 is a view of an engaging member for securing the upper end, or part of the screen in position. Fig. 3 is a side view of the screen removed from the window. Fig. 4 is a view of the section taken on the plane of the line 4—4 indicated in Fig. 1, showing the glass and the screen in their relative positions and as supported by the frame.

In the screen shown in the drawings the wire mesh 1 is secured in any suitable manner to the frame 2 of the screen 3. A strip 4 of a flexible material such as fabric or leather is also secured to the frame 2 of the screen 3 and so as to protrude therefrom in a position to wipe the edge of the openings of the automobile body when the screen is inserted in position in the opening, and so as to fill the space between the screen frame 2 and the body of the automobile and conform to any irregularity in the shape of the window opening of the automobile body. In the preferred form of structure the frame 2 is formed of strips 5 and 6 that are secured together by any suitable means and so as to clamp and secure the edge of the mesh 1 and an inner edge portion of the leather strip 4.

The structure of the window supporting part of automobiles vary. In Fig. 4 is shown one form of structure and may be considered to be a conventional illustration of the means used for supporting the glass of an automobile window. The glass 7, extends across the window opening of the frame and has an edge portion that extends into a channel 8 that is formed integral with or attached to the window frame formed by parts of the automobile body frame 16. Within the channel is located a cushioning material 9 usually formed of felt that covers the edge portion of the glass located within the channel and forms a means whereby the glass may be guided in its movement to an open and closed position and at the same time prevent rattling of the window as the automobile is driven over the road. The screen frame is located outside of the window 7 and is secured in position by sheet metal pieces that are made to engage the edge of the parts of the automobile frame that form the window openings. On the lower side of the screen is located a sheet metal piece 10 that is secured to the frame and which extends downward so as to engage that part of the automobile frame that forms the lower side of the window opening and within the piece that forms the top of the well of the window. If desired rubber feet 11 may also be secured to the lower edge of the window frame to cooperate with the flexible strip 4 to further cushion the screen, and thus prevent marring of the finish of the automobile. The screen is also provided with sheet metal pieces 12 that are pivotally connected to the sides of the screen and near the uppers corners of the screen. Thus when the screen is inserted in position on the outside of the glass 7 of the window, the pieces 12 are so positioned as to be located within the area of the screen. When the screen is located in position the sheet metal pieces are turned outwards so that they will engage the edge of the body frame that forms the window opening. The sheet metal pieces 12, being thin, they may be located between the channel shaped felt strips 9, and the body frame of the automobile and thus will not interfere with the movement of the glass 7 along the felt cushioning strips. In the particular form, of pieces 12 shown in the drawings, they are each secured by means of a staple 13 having one leg passing through the piece 12 and located nearer the center part of the screen while the other leg of the staple 13 is located near the edge of the screen. Each sheet metal piece 12 has a recess 14 that will fit over the outer leg of the staple and thus form a stop to hold the sheet metal piece in position of engagement within the body frame. When, therefore, it is desired to insert the screen in position it may be done by first placing it so that the sheet metal piece 10 will engage the body frame and then pushing the screen towards the window 7 and turning the sheet metal pieces 12 so that they will engage the body frame. Thus the screen will by reason of the flexible strip 4 cover the space of the window opening and exterior to the glass and be resiliently and yet securely held in position to effectively screen the interior of the automobile body.

I claim:

1. In an automobile window screen, for closed automobiles having glass windows and cushioned guides located in channels for guiding the glass when raised and lowered, a screen frame smaller than the size of the window opening of the body of the automobile frame, a flexible strip having an edge portion protruding from the edge of the screen frame and extending across the space between the screen frame and the body frame, a pair of sheet metal pieces pivotally connected to the screen frame near the upper corners of the screen frame for engaging the body frame at the sides of the window opening and between the cushioned guides and the body frame.

2. In an automobile window screen for closed automobiles having glass windows and cushioned guides located in channels for guiding the glass when raised and lowered, a screen frame smaller than the size of the window opening of the body of the automobile frame, a flexible strip having an edge portion protruding from the edge of the screen frame and extending across the space between the screen frame and the body frame, a pair of sheet metal pieces located near the upper corners of the screen frame for engaging the body frame at the sides of the window opening and between the cushioned guides and the body frame, staples having one leg extending through the last named sheet metal pieces for pivotally connecting the said pieces to the screen frame, each of the said last named sheet metal pieces having a recess fitting around the remaining leg of each staple.

In testimony whereof I have hereunto signed my name to this specification.

CLARENCE A. VOLKER.